US008564406B2

(12) United States Patent
Walsh et al.

(10) Patent No.: US 8,564,406 B2
(45) Date of Patent: *Oct. 22, 2013

(54) PAGER WITH A TOUCH-SENSITIVE DISPLAY SCREEN AND METHOD FOR TRANSMITTING A MESSAGE THEREFROM

(75) Inventors: Patrick Jay Walsh, Bloomingdale, IL (US); Theodore James Myers, East Dundee, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/489,286

(22) Filed: Jun. 5, 2012

(65) Prior Publication Data

US 2012/0244890 A1    Sep. 27, 2012

Related U.S. Application Data

(63) Continuation of application No. 10/840,954, filed on Jul. 16, 2003, now Pat. No. 8,193,908, which is a continuation of application No. 09/192,908, filed on Nov. 16, 1998, now Pat. No. 6,633,746.

(51) Int. Cl.
*G08B 5/22* (2006.01)
*H04Q 1/30* (2006.01)
*G08B 23/00* (2006.01)

(52) U.S. Cl.
USPC ......... 340/7.21; 340/7.55; 340/7.56; 340/8.1; 340/573.1

(58) Field of Classification Search
USPC .................. 340/7.21, 7.55, 7.56, 8.1, 573.1; 455/419, 458, 460; 128/903; 235/383, 235/472.01
See application file for complete search history.

(56) References Cited

U.S. PATENT DOCUMENTS

| | | | | |
|---|---|---|---|---|
| 5,546,538 A | * | 8/1996 | Cobbley et al. | 709/203 |
| 5,630,207 A | * | 5/1997 | Gitlin et al. | 340/7.23 |
| 5,644,339 A | * | 7/1997 | Mori et al. | 345/173 |
| 5,644,628 A | * | 7/1997 | Schwarzer et al. | 379/93.19 |
| 5,751,851 A | * | 5/1998 | Guzik et al. | 382/179 |
| 5,774,877 A | * | 6/1998 | Patterson et al. | 705/35 |
| 5,809,415 A | * | 9/1998 | Rossmann | 455/422.1 |
| 5,815,142 A | * | 9/1998 | Allard et al. | 345/173 |
| 5,973,612 A | * | 10/1999 | Deo et al. | 340/7.58 |
| 5,979,757 A | * | 11/1999 | Tracy et al. | 235/383 |
| 6,057,758 A | * | 5/2000 | Dempsey et al. | 340/539.12 |
| 6,225,976 B1 | * | 5/2001 | Yates et al. | 345/156 |
| 6,313,734 B1 | * | 11/2001 | Weiss et al. | 340/7.29 |

* cited by examiner

*Primary Examiner* — Nam V Nguyen
(74) *Attorney, Agent, or Firm* — Hartman & Citrin LLC

(57) ABSTRACT

An improved pager with a touch-sensitive display screen and method for transmitting a message therefrom is provided. Inputting a message onto the touch-sensitive display screen greatly facilitates sending a message from the pager and is more versatile than using navigation or soft keys to transmit built-in messages or using a small keyboard to type in messages. The pager of the preferred embodiments is operative to convert the inputted symbols into a text message and transmit the text message to a paging network. Because the pager transmits the content represented by the inputted symbols, the pager of the preferred embodiments is more versatile than pagers using ink-based systems, which merely transmit the image of the inputted symbol. If the pager is equipped with a browser application, the message from the pager can take the form of a request to a server located in a telecommunication network.

8 Claims, 4 Drawing Sheets

PAGER WITH A TOUCH-SENSITIVE DISPLAY SCREEN AND METHOD FOR TRANSMITTING A MESSAGE THEREFROM

This application is a continuation of U.S. patent application Ser. No. 10/840,954, filed Jul. 16, 2003, now U.S. Pat. No. 8,193,908; which is a continuation of U.S. patent application Ser. No. 09/192,908, filed Nov. 16, 1998, now U.S. Pat. No. 6,633,746; the contents of all of which are hereby incorporated by reference herein in their entirety into this disclosure.

TECHNICAL FIELD

The present invention relates generally to transmitting messages, such as a text message or a browser request, from a pager with a touch-sensitive display screen.

BACKGROUND

Cellular and paging networks can send information to cellular telephones and pagers, respectively. To send information to a cellular telephone, a cellular network uses multiple radio-frequency channels for real-time voice or data transmission. The cellular network can also use a store-and-forward messaging service known as Short-Message Service to forward messages from one channel of a cell site. To send information to a pager, a paging network uses a single, shared radio-frequency channel and a store-and-forward system to schedule message delivery over the shared channel. Two-way pagers typically operate on the 901-902, 930-931, and 940-941 MHz range.

Although both cellular telephones and pagers can be used to transmit information, cellular telephones are much more versatile. With a cellular telephone, a user can input voice information by speaking into the telephone and can input data information by using the telephone keypad to type alphanumeric characters. To transmit a message from a pager, a user is often limited to manipulating navigation keys (e.g., up and down arrows) or buttons corresponding to displayed soft keys to transmit built-in messages. Because the user's response is confined to built-in messages, two-way data communication using a pager is limited. Although some pagers have a keyboard to enable two-way data communication, some users may find the small keyboard difficult to use.

U.S. Pat. No. 5,751,693 to Dinkins offers one attempt to overcome the limitations associated with data transmission from a pager. A two-way messaging system is described at col. 7, lines 11-31 of the Dinkins patent in which a stylus is used to draw a message onto a data entry and display screen of a transmitting pager, and the drawn message is displayed on a receiving pager. The messaging system described in the Dinkins patent is an "ink-based" system—the written message or drawing transmitted to the receiving pager is essentially a duplicate of the message entered onto the screen of the transmitting pager. Because an image and not the content represented by the image is transmitted, ink-based systems are of limited use.

There is, therefore, a need for an improved pager with a touch-sensitive display screen and method for transmitting a message therefrom.

DETAILED DESCRIPTION OF THE PRESENTLY PREFERRED EMBODIMENTS

Figure 1:
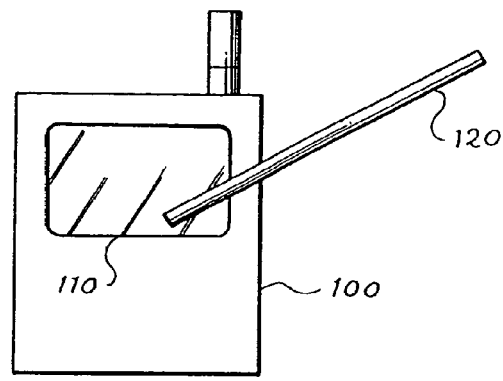
FIG. 1 is an illustration of a pager of a presently preferred embodiment.

By way of introduction, the preferred embodiments described below include a pager 100 with a touch-sensitive display screen 110 (FIG. 1) and a method for transmitting a message therefrom. Inputting a message onto the touch-sensitive display screen 110 using a stylus 120, for example, greatly facilitates sending a message from the pager 100 and is more versatile than using navigation or soft keys to transmit built-in messages or using a small keyboard to type in messages. The pager 100 of the preferred embodiments is operative to convert inputted symbols into a text message and transmit the text message to a paging network. Because the pager 100 transmits the content represented by the inputted symbols, the pager 100 of the preferred embodiments is more versatile than pagers using ink-based systems, which merely transmit the image of the inputted symbol. If the pager 100 is equipped with a browser application, the message from the pager 100 can take the form of a request to a server located in a telecommunication network.

Figure 2:
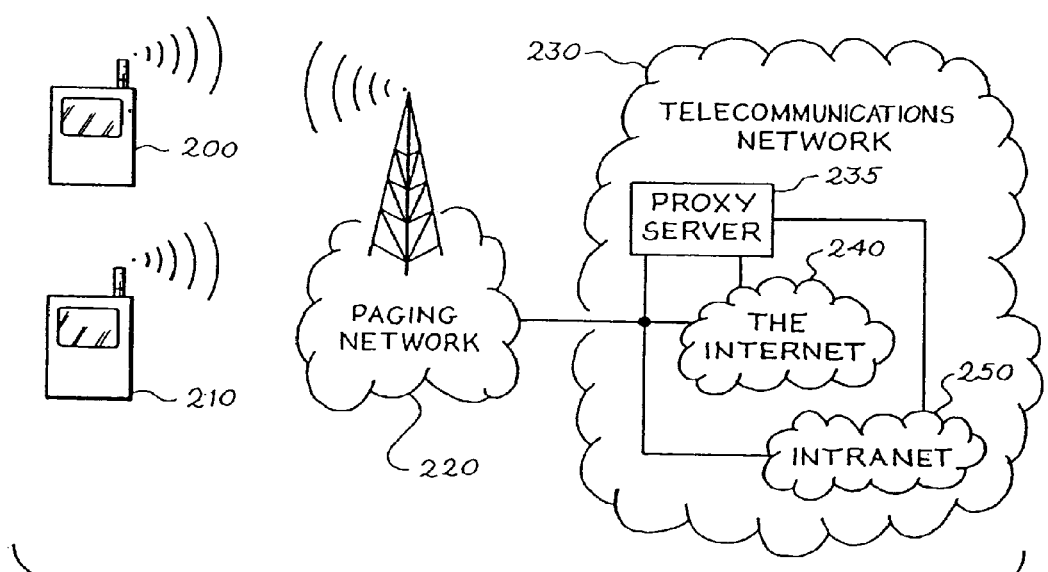
FIG. 2 is a block diagram of a telecommunications environment of a presently preferred embodiment.

Turning again to the drawings, FIG. 2 is an illustration of a telecommunications environment of a preferred embodiment. As shown in FIG. 2, this environment comprises first and second pagers 200, 210 in wireless communication with a paging network 220. The paging network 220 is coupled with a telecommunications network 230, which can comprise a proxy server 235, the Internet 240, and an intranet 250. As used herein, the term "telecommunications network" broadly refers to any data and/or voice network, including packet and/or switch-based networks.

Figure 3:
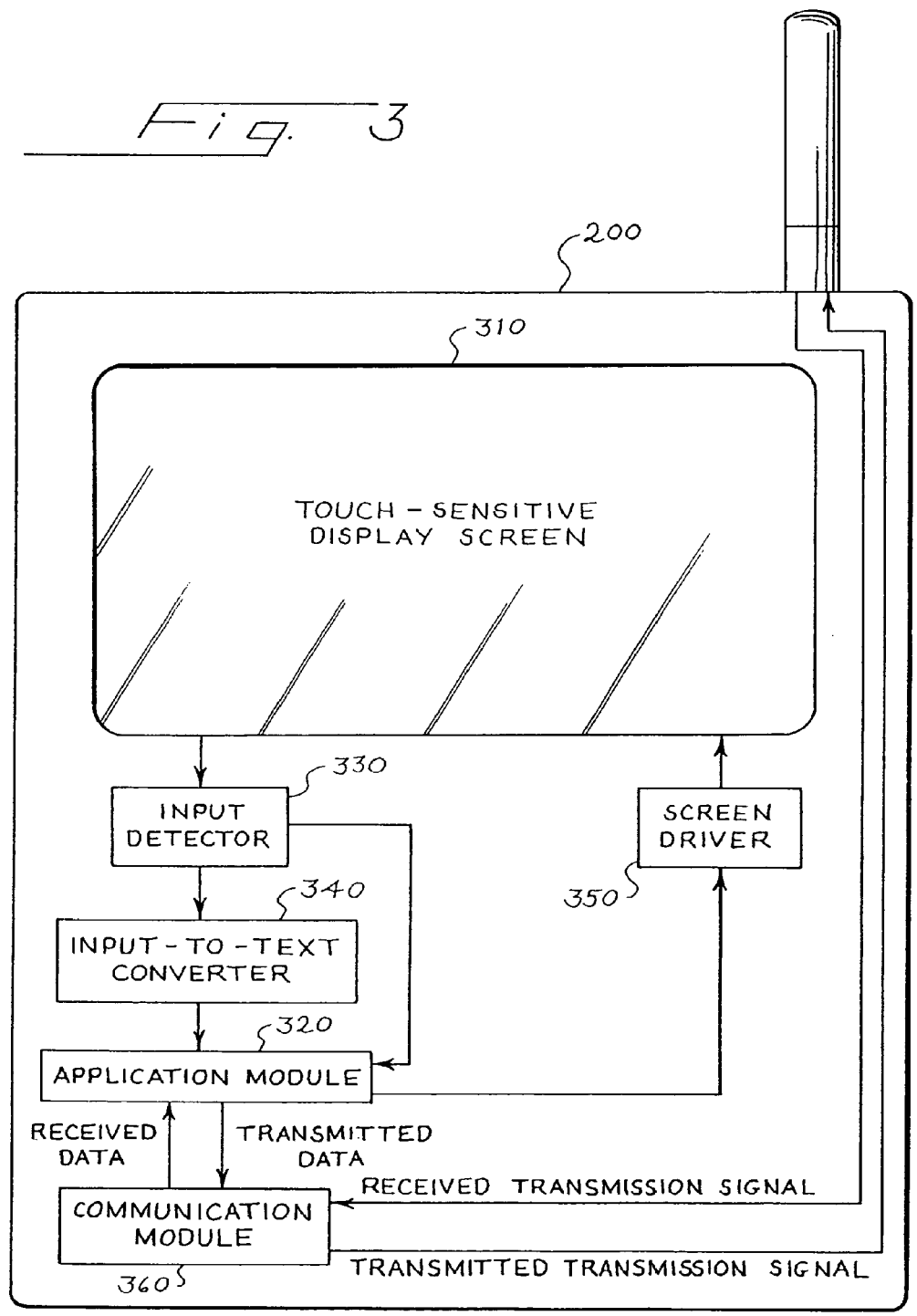
FIG. 3 is a block diagram showing a preferred implementation of a pager.

FIG. 3 is a block diagram of a preferred implementation of the first pager 200 of FIG. 2. As shown in FIG. 3, the first pager 200 comprises a touch-sensitive display screen 310 coupled with an application module 320 through an input detector 330 and an input-to-text converter 340 or through the input detector 330 alone. A screen driver 350 also couples the application module 320 with the touch-sensitive display screen 310. Lastly, a communication module 360 is coupled with the application module 320 to transmit and receive data sent to and from the application module 320 and transmit and receive transmission signals sent from and to the pager 200. As used herein, the term "coupled with" means directly coupled with or indirectly coupled with through one or more components. The first pager 200 can comprise additional components. Many, if not all, of these additional components may depend on the specific pager used and, thus, are not shown in FIG. 3.

The following two examples will illustrate the operation of the telecommunications environment of FIG. 2 and the block diagram of the first pager 200 of FIG. 3. In the first example, the application module 320 comprises a text messaging application, and the transmitted message comprises a text message. In the second example, the application module 320 comprises a browser application, and the transmitted message comprises a request from the browser application to a server located in the telecommunications network 230. Although two examples will be described below, it should be understood that the first pager 200 can be operative to perform other functions. For example, the stylus and touch-sensitive display screen can be used to select one of several available application functions.

Figure 4:
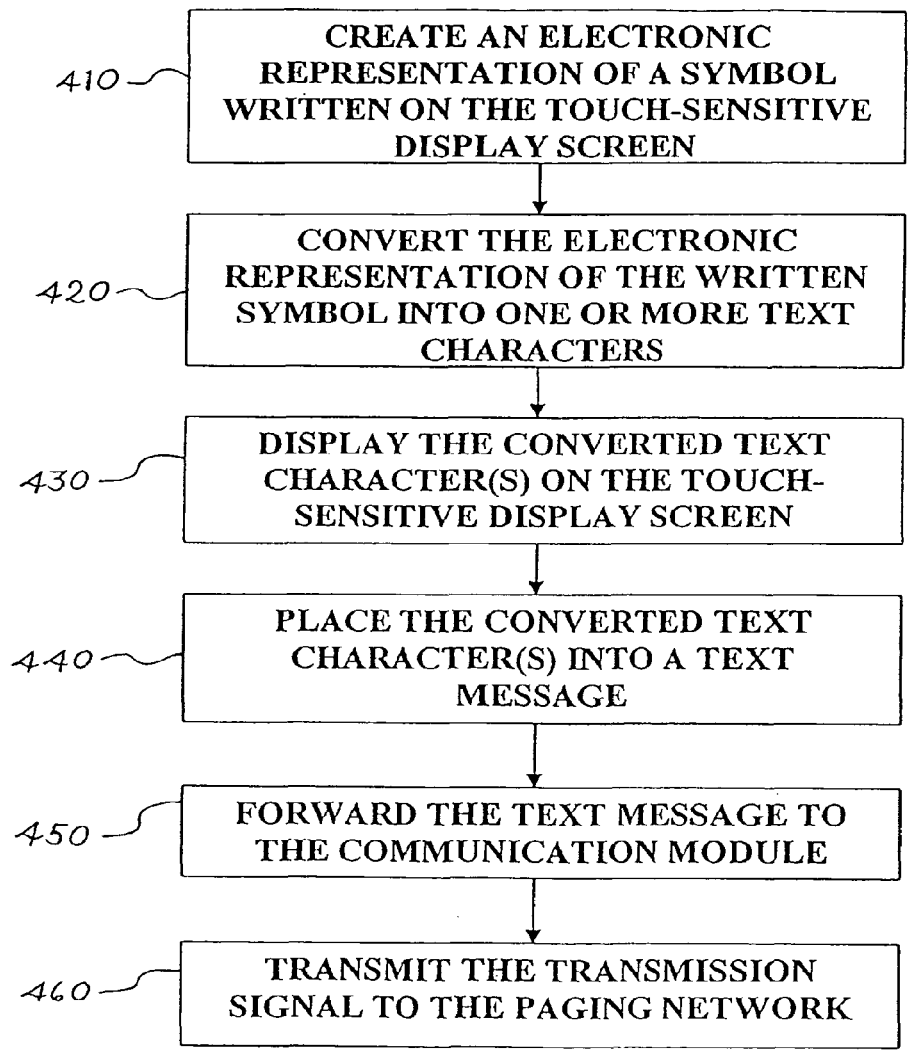
FIG. 4 is a flow chart of a preferred method for transmitting a text message from a pager.

The first example will be illustrated in reference to FIG. 4, which is a flow chart of a preferred method for transmitting a text message from the first pager 200. Using a stylus, a user writes a symbol on the touch-sensitive display screen 310, and the input detector 330 creates an electronic representation of the written symbol (step 410). Next, the input-to-text converter 340 converts the electronic representation of the written symbol into one or more text characters (step 420). For example, the input-to-text converter 340 can convert an entered symbol into a single alphanumeric character or can convert the symbol into a word or phrase.

The converted text character(s) are then transferred to the application module 320 (i.e., the messaging application), which instructs the screen driver 350 to display the converted text character(s) on the touch-sensitive display screen 310 (step 430). The messaging application also places the converted text character(s) into a text message (step 440) and then forwards the text message to the communication module 360 (step 450). The text message can be created and forwarded as each converted text character is received by the application module 320 or after the user indicates that his message is complete. Upon receipt, the communication module 360 converts the text message into a transmission signal and transmits the transmission signal to the paging network 220 (step 460). The paging network 220 can transfer the transmission signal to the second pager 210 for two-way data transmission or can transfer the transmission signal to the Internet 240 or the intranet 250 in the telecommunications network 230, which can deliver the message to a computer linked to the telecommunications network 230.

In addition to sending messages, the first pager 200 can also receive messages via the paging network 220 from, for example, the second pager 210, the Internet 240, or the intranet 250. When an incoming transmission signal is received, the communication module 360 converts the signal and transfers the received data to the application module 320, which then instructs the screen driver 350 to display the message in the appropriate form on the touch-sensitive display screen 310.

Figure 5:
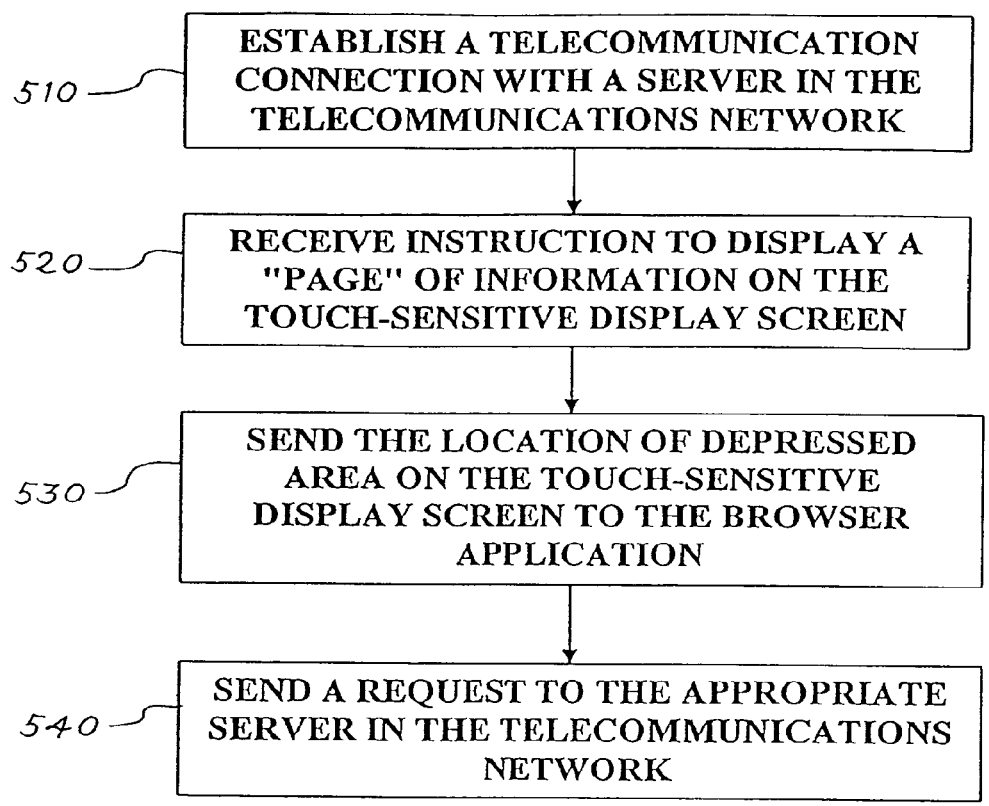
FIG. 5 is a flow chart of a preferred method for transmitting a request from a browser application in a pager to a server located in a telecommunications network.

In the second example, the application module 320 comprises a browser application, and the transmitted message comprises a request from the browser application to a server in the telecommunications network 230. FIG. 5 is a flow chart of a method of transmitting a request from a browser application in the first pager 200 to a server located in a telecommunications network 230. First, the browser application establishes a (real or virtual) telecommunication connection with a server in the telecommunications network 230 (step 510). The server then instructs the first pager 200 to display a "page" of information on the touch-sensitive display screen 310 (step 520). This page contains at least one display region associated with a request. When the user depresses the display region on the touch-sensitive display screen 310, the input detector 330 sends the location of the depressed area to the browser application (step 530), which determines that the user selected the display region. The browser application then sends a request, via the communication module 360, to the appropriate server in the telecommunications network 230 (step 540). The browser application can be a Web browser, and the display region can be a Universal Resource Locator ("URL") link. Selection of the link on the touch-sensitive display screen 310 causes the Web browser to send a request for a connection to the Web server associated with the selected URL. Because of the memory and computing limitations associated with a pager, it is preferred that the browser application be a thin device-based browser, such as Spyglass Device Mosaic.

Although the input-to-text converter 340 was described above in regard to the message application, the input-to-text converter 340 can also be used with the browser application. The following example illustrates this combination in the context of a stock-quote retrieval application. Using the stylus, the user activates the Web browser application in the first pager 200. The browser application then displays a default Web page via the screen driver 350. When the user selects the URL of a stock quoting service, the URL request is sent to the selected Web server. A Web page (i.e., the response to the request) is then returned to the application and displayed on the touch-sensitive display screen 310. The displayed Web page contains a prompt for the company name or abbreviation to be entered. Using the stylus, the user writes the symbols on the touch-sensitive display screen 310. The input-to-text converter 340 converts the symbols into text characters, which are then displayed. When the user enters the last symbol, he selects an enter prompt with the stylus. The application then sends the request to the server hosting the stock quoting service, which returns the stock quote for display on the touch-sensitive display screen 310.

Hypertext markup language ("HTML") is often used to deliver content from hypertext transport protocol ("HTTP") servers to Web browsers. HTML, however, does not scale well to small displays and mouseless user interfaces and has difficulty delivering information to handheld devices with size, memory and cost constraints. To overcome these difficulties, it is preferred that a proxy server 235 translate the content from a server to a format that matches the relatively limited display capabilities of the pager. A proxy server 235, such as Spyglass Prism 2.0, can convert memory and bandwidth-intensive color images into a simpler, grayscale format and resize the images for the pager's smaller display screen. Additionally, the proxy server 235 can extract certain elements from a page and place them on a template that the pager can easily display. In another preferred approach, a handheld device markup language ("HDML") is used in conjunction with a handheld device transport protocol ("HDTP") in lieu of HTML and HTTP. HDML is a language specification optimized for wireless Internet access from devices with small displays and mouseless interfaces, and HDTP is a protocol specification that enables paging networks to provide Internet access from standard handheld devices.

It is preferred that the touch-sensitive display screen 310 be a liquid crystal display ("LCD") screen. It is also preferred that the input-to-text converter 340 have notational language capability, preferably Graffiti by 3Com. Alternatively, the input-to-text converter 340 can be equipped with handwriting recognition functionality, such as Print Recognition from Apple Computers or Natural Handwriting Recognition from Parascript. It is also preferred that the communication module 360 use the Motorola Flex Protocol Family for accessing the paging network 220 and TCP/IP protocols for data communication. Additionally, it is preferred that an IP mobility manager, such as RFC 2002, be used to allow the first pager to use a fixed or dynamic IP address while moving across IP network boundaries, thereby providing the appearance of a seamless network to the applications.

Also for simplicity, the terms "application module", "input detector", "input-to-text converter", "screen driver", and "communication module" are used in the specification and claims to broadly refer to hardware and/or software that can be used to perform the functions described above. It is important to note that any appropriate software language and any appropriate hardware, analog or digital, now in existence or later developed, can be used. A computer-usable medium having computer readable program code embodied therein can be used to perform the functions described above, and the functions described above can alternatively be implemented exclusively with hardware. Additionally, the functionality associated with each element can be combined with or distributed to other elements. Also, some of the elements described above may not be needed in all embodiments.

It is intended that the foregoing detailed description be understood as an illustration of selected forms that the invention can take and not as a definition of the invention. It is only the following claims, including all equivalents, that are intended to define the scope of this invention.

What is claimed is:

1. A pager comprising:
   a communication module operative to connect with a network and to receive from the network an instruction to display a page, the page including at least one display region associated with a request;
   a touch-sensitive display screen in communication with the communication module and operative to display the page of information including the at least one display region associated with the request, the touch-sensitive screen including an input detector operative to identify a selected area of the touch-sensitive display screen;
   an input-to-text converter in communication with the input detector and operative to define at least one text character representative of one or more symbols hand-written on the touch-sensitive display screen;
   an application module in communication with the input detector, the input-to-text converter, and the communication module, the application module including a messaging application operative to receive the at least one text character from the input-to-text converter;
   wherein the messaging application is further operative to place the at least one text character into a text message;
   wherein the messaging application is further operative to transmit the text message to the network;
   wherein the application module further includes a browser application operative to display a web page in response to the identification of the selected area;
   wherein the web page is of a stock quoting service;
   wherein the browser application is further operative to receive the at least one text character from the input-to-text converter,
      place the at least one text character into a stock quote request in response to the identification of the selected area associated with the request for the stock quote,
      transmit, over the network, the stock quote request, and
      display a received stock quote on the touch-sensitive display screen.

2. The pager of claim 1, wherein the browser application comprises a web browser.

3. The pager of claim 1, further comprising a screen driver in communication with the touch-sensitive display screen and operative to generate the display region associated with the request on the touch-sensitive display screen.

4. The pager of claim 1, wherein the selected area of the touch-sensitive display screen is identified by depression from a stylus.

5. A method comprising:
   receiving a communication from a network;
   displaying a page including a display region on a touch-sensitive display screen, the display region being associated with a request;
   displaying a message on the touch-sensitive display screen based on the received communication;
   identifying a selected area of the touch-sensitive display screen as a handwritten symbol;
   converting the handwritten symbol into at least one text character;
   placing the at least one text character into a text message;
   transmitting the text message to the network;
   displaying a web page upon converting the at least one text character;
   wherein the web page is of a stock quoting service;
   placing the at least one text character into a stock quote request;
   transmitting the stock quote request to the network; and
   displaying a received stock quote on the touch-sensitive display screen.

6. The method of claim 5, wherein the identification of the selected area of the touch-sensitive display screen is by depression from a stylus.

7. The method of claim 5, further comprising displaying the at least one text character on the touch-sensitive display screen when the at least one text character is converted.

8. A computer-usable medium storing computer readable program code that, when executed by a processor, causes the processor to perform operations comprising:
   receiving a communication from the network;
   displaying a page including a display region on a touch-sensitive display screen, the display region being associated with a request;
   displaying a message on the touch-sensitive display screen based on the received communication;
   identifying a selected area of the touch-sensitive display screen as a handwritten symbol;
   converting the handwritten symbol into at least one text character;
   placing the at least one text character into a text message;
   transmitting the text message to the network;
   displaying a web page upon converting the at least one text character;
   placing the at least one text character into a stock quote request;
   transmitting the stock quote request to the network; and
   displaying a received stock quote on the touch-sensitive display screen.

* * * * *